US011814515B2

(12) United States Patent
Guery et al.

(10) Patent No.: US 11,814,515 B2
(45) Date of Patent: Nov. 14, 2023

(54) PNEUMATIC TIRE COMPRISING A RUBBER COMPOSITION CONTAINING A THERMOPLASTIC POLYURETHANE

(71) Applicant: COMPAGNIE GENERALE DES ETABLISSEMENTS MICHELIN, Clermont-Ferrand (FR)

(72) Inventors: Cyrille Guery, Clermont-Ferrand (FR); Jose-Carlos Araujo Da Silva, Clermont-Ferrand (FR)

(73) Assignee: COMPAGNIE GENERALE DES ETABLISSEMENTS MICHELIN, Clermont Ferrand (FR)

( * ) Notice: Subject to any disclaimer, the term of this patent is extended or adjusted under 35 U.S.C. 154(b) by 372 days.

(21) Appl. No.: 17/285,695

(22) PCT Filed: Oct. 7, 2019

(86) PCT No.: PCT/FR2019/052369
§ 371 (c)(1),
(2) Date: Apr. 15, 2021

(87) PCT Pub. No.: WO2020/079345
PCT Pub. Date: Apr. 23, 2020

(65) Prior Publication Data
US 2021/0292516 A1    Sep. 23, 2021

(30) Foreign Application Priority Data

Oct. 15, 2018    (FR) ........................................ 1859517

(51) Int. Cl.
| C08L 5/00  | (2006.01) |
| C08L 7/00  | (2006.01) |
| B60C 1/00  | (2006.01) |
| C08L 75/06 | (2006.01) |

(52) U.S. Cl.
CPC .............. *C08L 7/00* (2013.01); *B60C 1/0016* (2013.01); *C08L 75/06* (2013.01); *B60C 2200/065* (2013.01); *B60C 2200/08* (2013.01); *C08L 2207/04* (2013.01); *C08L 2312/02* (2013.01)

(58) Field of Classification Search
CPC ................ C08L 15/00; C08L 7/00; B60C 1/00
USPC ........................................................ 524/507
See application file for complete search history.

(56) References Cited

U.S. PATENT DOCUMENTS

| 3,875,118  | A  | 4/1975  | Meisert et al. |
| 4,124,572  | A  | 11/1978 | Mao |
| 4,182,898  | A  | 1/1980  | Fujiwara et al. |
| 5,227,425  | A  | 7/1993  | Rauline |
| 5,852,099  | A  | 12/1998 | Vanel |
| 5,900,449  | A  | 5/1999  | Custodero et al. |
| 6,420,488  | B1 | 7/2002  | Penot |
| 6,536,492  | B2 | 3/2003  | Vasseur |
| 6,610,261  | B1 | 8/2003  | Custodero et al. |
| 6,747,087  | B2 | 6/2004  | Custodero et al. |
| 6,975,396  | B2 | 12/2005 | Custodero et al. |
| 7,135,517  | B2 | 11/2006 | Simonot et al. |
| 7,199,175  | B2 | 4/2007  | Vasseur |
| 7,202,295  | B2 | 4/2007  | Simonot et al. |
| 7,250,463  | B2 | 7/2007  | Durel et al. |
| 7,256,233  | B2 | 8/2007  | Simonot et al. |
| 7,425,313  | B2 | 9/2008  | Custodero et al. |
| 7,820,771  | B2 | 10/2010 | Lapra et al. |
| 7,900,667  | B2 | 3/2011  | Vasseur |
| 7,999,036  | B2 | 8/2011  | Nishioka et al. |
| 8,461,269  | B2 | 6/2013  | Varagniat et al. |
| 8,883,929  | B2 | 11/2014 | Gandon-Pain et al. |
| 9,724,968  | B2 | 8/2017  | Kitano et al. |
| 11,241,370 | B2 | 2/2022  | Valero et al. |
| 2001/0034389 | A1 | 10/2001 | Vasseur |
| 2002/0004549 | A1 | 1/2002  | Custodero et al. |
| 2003/0202923 | A1 | 10/2003 | Custodero et al. |
| 2003/0212185 | A1 | 11/2003 | Vasseur |
| 2004/0030017 | A1 | 2/2004  | Simonot et al. |
| 2005/0004297 | A1 | 1/2005  | Durel et al. |
| 2005/0032965 | A1 | 2/2005  | Valero |
| 2005/0171264 | A1 | 8/2005  | Simonot et al. |
| 2005/0267242 | A1 | 12/2005 | Custodero et al. |
| 2006/0009564 | A1 | 1/2006  | Simonot et al. |
| 2007/0112120 | A1 | 5/2007  | Vasseur |
| 2008/0027176 | A1 | 1/2008  | Nishioka et al. |
| 2008/0045643 | A1 | 2/2008  | Henning et al. |
| 2008/0132644 | A1 | 6/2008  | Lapra et al. |
| 2009/0270558 | A1 | 10/2009 | Gandon-Pain et al. |
| 2010/0022714 | A1 | 1/2010  | Varagniat et al. |
| 2010/0221541 | A1 | 9/2010  | Valero et al. |
| 2011/0021702 | A1 | 1/2011  | Gandon-Pain et al. |
| 2011/0263784 | A1 | 10/2011 | Valero et al. |
| 2012/0208948 | A1 | 8/2012  | Gandon-Pain et al. |
| 2013/0096230 | A1* | 4/2013 | Abad ..................... C08J 3/20 523/351 |

(Continued)

FOREIGN PATENT DOCUMENTS

| CA | 2168938 A1 | 9/1996 |
| CA | 2322093 A1 | 2/2001 |

(Continued)

OTHER PUBLICATIONS

International Search Report dated Jan. 31, 2020, in corresponding PCT/FR2019/052369 (4 pages).

(Continued)

*Primary Examiner* — Deve V Hall
(74) *Attorney, Agent, or Firm* — VENABLE LLP

(57) ABSTRACT

A tire which has improved mechanical properties comprises a rubber composition based on at least one diene elastomer, at least one thermoplastic polyurethane, and a crosslinking system; the composition does not comprise any reinforcing filler or comprises less than 25 parts by weight thereof per hundred parts by weight of elastomer, phr, the carbon black content in the composition being less than 20 phr.

10 Claims, No Drawings

(56) References Cited

U.S. PATENT DOCUMENTS

| | | |
|---|---|---|
| 2013/0345336 A1 | 12/2013 | Lopitaux |
| 2014/0076473 A1* | 3/2014 | Abad ............... B60C 11/0008 152/209.1 |
| 2014/0096882 A1 | 4/2014 | Kitano et al. |
| 2014/0190604 A1* | 7/2014 | Custodero ............... C08K 7/24 152/209.1 |
| 2015/0004413 A1 | 1/2015 | Abad et al. |
| 2018/0355152 A1* | 12/2018 | Araujo Da Silva .... C08L 53/02 |
| 2021/0291590 A1 | 9/2021 | Araujo Da Silva et al. |

FOREIGN PATENT DOCUMENTS

| | | |
|---|---|---|
| CN | 103732398 A | 4/2014 |
| CN | 104093551 A | 10/2014 |
| EP | 0501227 A1 | 9/1992 |
| EP | 0735088 A1 | 10/1996 |
| EP | 0810258 A1 | 12/1997 |
| FR | 2201320 | 4/1974 |
| FR | 3060013 A1 | 6/2018 |
| JP | 2010-144039 A | 7/2010 |
| JP | 5485545 B2 | 5/2014 |
| NO | 2006/069792 A1 | 7/2006 |
| WO | 97/36724 A2 | 10/1997 |
| WO | 99/16600 A1 | 4/1999 |
| WO | 99/28376 A2 | 6/1999 |
| WO | 00/05300 A1 | 2/2000 |
| WO | 00/05301 A1 | 2/2000 |
| WO | 00/73372 A1 | 12/2000 |
| WO | 02/10269 A2 | 2/2002 |
| WO | 02/053634 A1 | 7/2002 |
| WO | 03/016215 A1 | 2/2003 |
| WO | 03/016387 A1 | 2/2003 |
| WO | 2004/003067 A1 | 1/2004 |
| WO | 2004/056915 A1 | 7/2004 |
| WO | 2006/069793 A1 | 7/2006 |
| WO | 2008/003434 A1 | 1/2008 |
| WO | 2008/003435 A1 | 1/2008 |
| WO | 2013/041151 A1 | 3/2013 |
| WO | WO-2017097948 A1 * | 6/2017 ........... B60C 1/0008 |

OTHER PUBLICATIONS

S. Brunauer, et al., "Adsorption of Gases in Multimolecular Layers", J. Am. Chem. Soc., vol. 60, pp. 309-319 (1938).

\* cited by examiner

PNEUMATIC TIRE COMPRISING A RUBBER COMPOSITION CONTAINING A THERMOPLASTIC POLYURETHANE

BACKGROUND

The field of the present invention is that of rubber compositions reinforced by a reinforcing filler which can be used in the manufacture of tyres for vehicles.

During running, a tyre tread is subjected to mechanical stresses and to attacks resulting from direct contact with the ground. In the case of a tyre fitted to a vehicle bearing heavy loads, the mechanical stresses and the attacks undergone by the tyre are magnified under the effect of the weight borne by the tyre.

Off-road tyres are subjected to high stresses, both locally: running over the indenting macrobodies represented by the stones from which the tracks are formed (crushed rock), but also globally: high torque transmission during running on slopes, generally of about 10%, and high stresses on the tyres during U-turns for loading and unloading manoeuvres.

The consequence of this is that the initiating cracks which are created in the tread under the effect of these stresses and these attacks have a tendency to propagate further. The propagation of cracks within the tyre can lead to its damage and therefore can reduce its life.

This is particularly true for the tyres equipping civil engineering vehicles which are moving about generally in mines. This is also true for the tyres which are fitted to agricultural vehicles, due to the stony ground surface of arable land. The tyres which equip worksite heavy-duty vehicles, which are moving both on stony ground surfaces and on bituminous ground surfaces, also experience these same attacks. Due to the two aggravating factors, which are the weight borne by the tyre and the aggressive nature of the running ground, the resistance to the initiation of cracks and good mechanical properties of a tyre for a civil engineering vehicle, an agricultural vehicle or a worksite heavy-duty vehicle prove to be crucial for increasing its life.

It is therefore important to have tyres available for vehicles, in particular those carrying heavy loads, the composition of which has improved mechanical properties with respect to breaking, and good reinforcement.

Furthermore, it remains advantageous for the solutions provided in order to solve this problem not to be disadvantageous to the other properties of the rubber composition, in particular the stiffness and the hysteresis. This is because the use of a hysteretic composition in a tyre may manifest itself by a rise in the internal temperature of the tyre, which may also result in a reduction in the durability of the tyre.

SUMMARY

In the light of the above, it is an ongoing objective to provide rubber compositions which have good mechanical properties, without being disadvantageous to the reinforcement, or even while improving it.

Continuing its research, the applicant has discovered that the addition of a thermoplastic polyurethane to a rubber composition for tyres makes it possible to solve the aforementioned technical problem as long as the content of reinforcing filler is not too high.

Thus, a subject of the present invention is a tyre which comprises a composition based on at least one diene elastomer, at least one thermoplastic polyurethane, and a crosslinking system; the composition not comprising any reinforcing filler or comprising less than 25 phr thereof, the carbon black content in the composition being less than 20 phr.

DETAILED DESCRIPTION

I—Definitions

The expression "composition based on" should be understood as meaning a composition comprising the mixture and/or the product of the in situ reaction of the various constituents used, some of these constituents being able to react and/or being intended to react with one another, at least partially, during the various phases of manufacture of the composition; it thus being possible for the composition to be in the completely or partially crosslinked state or in the noncrosslinked state.

The expression "part by weight per hundred parts by weight of elastomer" (or phr) should be understood as meaning, for the purposes of the present invention, the part by weight per hundred parts by weight of elastomers, whether or not they are thermoplastic. In other words, for the purposes of the present invention, the thermoplastic polyurethanes are considered to be elastomers.

In the present document, unless expressly indicated otherwise, all the percentages (%) indicated are percentages (%) by weight.

Furthermore, any interval of values denoted by the expression "between a and b" represents the range of values extending from more than "a" to less than "b" (i.e. limits a and b excluded), while any interval of values denoted by the expression "from a to b" means the range of values extending from "a" up to "b" (i.e. including the strict limits a and b). In the present document, when an interval of values is described by the expression "from a to b", the interval represented by the expression "between a and b" is also and preferentially described.

When reference is made to a "predominant" compound, this is understood to mean, for the purposes of the present invention, that this compound is predominant among the compounds of the same type in the composition, that is to say that it is the one which represents the greatest amount by weight among the compounds of the same type. Thus, for example, a predominant elastomer is the elastomer representing the greatest weight with respect to the total weight of the elastomers in the composition. In the same way, a "predominant" filler is that representing the greatest weight among the fillers of the composition. By way of example, in a system comprising just one elastomer, the latter is predominant for the purposes of the present invention and, in a system comprising two elastomers, the predominant elastomer represents more than half of the weight of the elastomers. Preferably, the term "predominant" is understood to mean present at more than 50%, preferably more than 60%, 70%, 80%, 90%, and more preferentially the "predominant" compound represents 100%.

The compounds comprising carbon mentioned in the description can be of fossil origin or biosourced. In the latter case, they may be partially or completely derived from biomass or may be obtained from renewable starting materials derived from biomass. Polymers, plasticizers, fillers, etc., are concerned in particular.

II—Description of the Invention

II-1 Diene Elastomer

The rubber compositions of the tyre of the invention can comprise just one diene elastomer or a mixture of several diene elastomers.

"Diene" elastomer (or, without distinction, rubber), whether natural or synthetic, should be understood, in a known way, as meaning an elastomer composed, at least in part (i.e., a homopolymer or a copolymer), of diene monomer units (monomers bearing two conjugated or non-conjugated carbon-carbon double bonds).

These diene elastomers can be classified into two categories: "essentially unsaturated" or "essentially saturated". The term "essentially unsaturated" is generally understood to mean a diene elastomer resulting at least in part from conjugated diene monomers, having a content of units of diene origin (conjugated dienes) which is greater than 15% (mol %); it is thus that diene elastomers such as butyl rubbers or copolymers of dienes and of α-olefins of EPDM type do not come within the preceding definition and can in particular be described as "essentially saturated" diene elastomers (low or very low content, always less than 15%, of units of diene origin).

The expression "diene elastomer that can be used in the compositions in accordance with the invention" is understood particularly to mean:

(a) any homopolymer of a conjugated or non-conjugated diene monomer having from 4 to 18 carbon atoms;
(b) any copolymer of a conjugated or non-conjugated diene having from 4 to 18 carbon atoms and of at least one other monomer.

The other monomer can be ethylene, an olefin or a conjugated or non-conjugated diene.

Suitable as conjugated dienes are conjugated dienes having from 4 to 12 carbon atoms, especially 1,3-dienes, such as, in particular, 1,3-butadiene and isoprene.

Suitable as olefins are vinylaromatic compounds having from 8 to 20 carbon atoms and aliphatic α-monoolefins having from 3 to 12 carbon atoms.

Suitable as vinylaromatic compounds are, for example, styrene, ortho-, meta- or para-methylstyrene, the "vinyltoluene" commercial mixture or para-(tert-butyl)styrene.

Suitable as aliphatic α-monoolefins are in particular acyclic aliphatic α-monoolefins having from 3 to 18 carbon atoms.

Preferentially, the diene elastomer is selected from the group consisting of polybutadienes (BRs), natural rubber (NR), synthetic polyisoprenes (IRs), butadiene copolymers, isoprene copolymers and the mixtures of these elastomers. The butadiene copolymers are particularly selected from the group consisting of butadiene/styrene copolymers (SBRs).

Advantageously, the diene elastomer predominantly comprises at least one isoprene elastomer. "Isoprene elastomer" is understood to mean, in a known way, an isoprene homopolymer or copolymer, in other words an isoprene elastomer selected from the group comprising or consisting of natural rubber (NR), which may be plasticized or peptized, synthetic polyisoprenes (IRs), various isoprene copolymers and the mixtures of these elastomers. Mention will in particular be made, among isoprene copolymers, of isobutene/isoprene (butyl rubber IIR), isoprene/styrene (SIR), isoprene/butadiene (BIR) or isoprene/butadiene/styrene (SBIR) copolymers.

The isoprene elastomer is preferably selected from the group consisting of natural rubber, synthetic polyisoprenes and mixtures thereof. Use is preferably made, among these synthetic polyisoprenes, of polyisoprenes having a content (molar %) of cis-1,4-bonds of greater than 90%, more preferentially still of greater than 98%. More preferably, the diene elastomer is natural rubber.

Preferentially, the content of diene elastomer, preferably of isoprene elastomer, preferably natural rubber, in the composition of the tyre according to the invention, is within a range extending from 20 to 90 phr, preferably from 30 to 80 phr, more preferably from 35 to 70 phr.

Whether it contains just one diene elastomer or a mixture of several diene elastomers, the rubber composition according to the invention can also contain, in a minor way, any type of synthetic elastomer other than a diene elastomer, indeed even with polymers other than elastomers, for example thermoplastic polymers. Preferably, the rubber composition according to the invention does not contain a synthetic elastomer other than a diene elastomer or a polymer other than elastomers or contains less than 10 phr, preferably less than 5 phr, thereof.

II-2 Thermoplastic Polyurethane

The composition of the tyre according to the invention has the essential characteristic of comprising a thermoplastic polyurethane (TPU), which can be any thermoplastic polyurethane, well known to those skilled in the conventional art.

The TPUs that can be used in the context of the present invention advantageously comprise at least one flexible segment and at least one rigid segment. Advantageously, they are block copolymers alternating rigid segments and flexible segments. The rigid segments can in particular be obtained from the reaction of a polyisocyanate (generally a diisocyanate) with a diol or a triol of low molecular weight (preferably within a range extending from 40 to 350 g/mol), called chain extender. By way of example of a low molecular weight diol, mention may be made, without being limited to these examples, of ethylene glycol, diethylene glycol, propanediol, butanediol, hexanediol, isosorbide, hydroquinone, etc. By way of example of a low molecular weight triol, mention may be made, without being limited to these examples, of trimethylol propane, glycerol, etc. Moreover, the polyisocyanate can be aromatic, such as MDI (methylene diphenyl diisocyanate), toluene diisocyanate (TDI) or phenylene diisocyanate (PPDI), aliphatic, such as hexamethylene diisocyanate (HDI) or isoprene diisocyanate (IPDI), alicyclic, such as H12 MDI (4,4-dicyclohexylmethane diisocyanate), or combinations thereof. The flexible segments can in particular result from the reaction of a polyisocyanate with a polyol comprising a long hydrocarbon-based chain (the molecular weight of the hydrocarbon-based chain of the polyisocyanate is generally between 600 and 2500 g/mol). The polyol can be of the ether or ester type (generally a polyester glycol or a polyether glycol), but also of the polycarbonate type. For example, for the polyesters, mention may be made of polyadipates or polycaprolactones, for the polyethers: polypropylene glycols and polytetramethylene glycols, and for the polycarbonates: polycarbonate diols. The flexible block of the polyurethane can also be partially crosslinked, for example with a hyperbranched or dendritic polyol.

TPUs exhibit both elastomeric and thermoplastic properties. They exhibit, in a well-known manner, a Tg peak (flexible segments of the TPU) and a melting point peak (rigid segments of the TPU) (Mp, measured in a well-known manner by DSC according to Standard ASTM D3418). Thus, the flexible segments of the TPUs are generally defined by a Tg which can be less than or equal to ambient temperature (25° C.), while the rigid segments can have an Mp greater than or equal to 80° C.

In the present patent application, when reference is made to the glass transition temperature of a TPU, it is the glass transition temperature relating to the flexible segment (unless otherwise indicated).

By way of examples of TPUs that can be used in the context of the present invention, mention may be made of those described in document FR 2 201 320, U.S. Pat. Nos. 4,124,572, 4,182,898, US 2003/0032754, CA 2 322 093 or CA 2 168938 for example.

According to the invention, the at least one thermoplastic polyurethane advantageously has an elongation at break greater than 500% and a modulus at break greater than 30 MPa, measured according to Standard DIN53504. More preferentially, the at least one thermoplastic polyurethane has an elongation at break greater than 600% and 35 MPa, measured according to Standard DIN53504.

Advantageously, the at least one thermoplastic polyurethane has a Shore A hardness, measured according to the standard according to DIN 53 505, ranging from 60 to 100, preferably from 70 to 90.

Moreover, the at least one thermoplastic polyurethane advantageously has a viscosity at 170° C., measured according to the method described below, ranging from 1000 to 10 000 Pa·s, preferably from 1500 to 8500 Pa·s, more preferably from 2500 to 7500 Pa·s.

The method for measuring the viscosity uses an RPA 2000LV rheology device (oscillating disc rheometer) equipped with the standard 200 in·lbs (22.6 Nm) viscosity sensor. The RPA device makes it possible to stress in torsion a sample of material enclosed in a chamber having biconical walls. In order to carry out the measurement, a sample of material having a diameter of approximately 30 mm and a weight of approximately 5 g is deposited in the chamber of the RPA (A total volume of 8 cm$^3$ is regarded as optimal; the amount is sufficient when a small amount of sample escapes from each side of the chamber and is visible at the end of the test). Preferably, the material is cut out beforehand from a sheet of this material. In the case where this sheet of material is insufficiently thick, it is possible to stack the sections of this sheet of material. Firstly, a is shaping operation is carried out by applying, to the sample enclosed in the chamber, a temperature of 180° C. for 5 min with a shearing of 2.78% (i.e., an angle of 0.19°). At the end of this operation, the sample is completely moulded in the closed chamber of the RPA. The sample is subsequently cooled to 130° C. directly in the chamber of the RPA. It is then possible to start the measurement of the viscosity value at 500% of alternating dynamic shear (i.e. an angle of 36°) and 0.1 Hz in a temperature range varying from 130 to 200° C. A curve of variation in viscosity $\eta^*$ as a function of the temperature is obtained, on which the viscosities $\eta^*$ of the composition can be extracted at 170° C. The shaping and measuring steps are carried out without intervention, by programming the RPA machine.

By way of examples of commercially available TPUs, mention may be made of Desopam® 3378A sold by the company Bayer, Irogran® A85C 4957 from the company Huntsman, Elastollan® 1175AW from the company BASF, or Pearlthane® 11T80 from the company Lubrizol.

The content of thermoplastic polyurethane in the composition of the tyre according to the invention is advantageously within a range extending from 10 to 80 phr, preferably from 20 to 70 phr, more preferably from 30 to 65 phr.

II-3 Crosslinking System

The crosslinking system can be any type of system known to those skilled in the art in the field of rubber compositions for tyres. It can in particular be based on sulfur, and/or on peroxide and/or on bismaleimides.

Preferentially, the crosslinking system is based on sulfur; it is then called a vulcanization system. The sulfur can be contributed in any form, in particular in the form of molecular sulfur and/or of a sulfur-donating agent. At least one vulcanization accelerator is also preferentially present, and, optionally, also preferentially, use may be made of various known vulcanization activators, such as zinc oxide, stearic acid or equivalent compounds, such as stearic acid salts, and salts of transition metals, guanidine derivatives (in particular diphenylguanidine), or also known vulcanization retarders.

The sulfur is used at a preferential content of between 0.5 and 12 phr, in particular between 1 and 10 phr. The vulcanization accelerator is used at a preferential content of between 0.5 and 10 phr, more preferentially of between 0.5 and 5.0 phr.

Use may be made, as accelerator, of any compound capable of acting as accelerator of is the vulcanization of diene elastomers in the presence of sulfur, in particular accelerators of the thiazole type, and also their derivatives, or accelerators of sulfenamide, thiuram, dithiocarbamate, dithiophosphate, thiourea and xanthate types. Mention may in particular be made, as examples of such accelerators, of the following compounds: 2-mercaptobenzothiazyl disulfide (abbreviated to MBTS), N-cyclohexyl-2-benzothiazole-sulfenamide (CBS), N,N-dicyclohexyl-2-benzothiazole-sulfenamide (DCBS), N-(tert-butyl)-2-benzothiazole-sulfenamide (TBBS), N-(tert-butyl)-2-benzothiazolesulfenimide (TBSI), tetrabenzylthiuram disulfide (TBZTD), zinc dibenzyldithiocarbamate (ZBEC) and the mixtures of these compounds.

II-4 Reinforcing Filler

The elastomeric matrix, the thermoplastic polyurethane and the crosslinking system are sufficient by themselves for the invention to be carried out. Nevertheless, the composition of the tyre according to the invention can comprise a reinforcing filler, known for its abilities to reinforce a rubber composition which can be used for the manufacture of tyres.

According to the invention, the composition of the tyre does not comprise any reinforcing filler or comprises less than 25 phr thereof, the carbon black content in the composition being less than 20 phr.

Use may be made of any type of "reinforcing" filler known for its abilities to reinforce a rubber composition which can be used in particular for the manufacture of tyres, for example an organic filler, such as carbon black, an inorganic filler, such as silica, or also a mixture of these two types of fillers.

All carbon blacks, in particular the blacks conventionally used in tyres or their treads, are suitable as carbon blacks. Among the latter, mention will more particularly be made of the reinforcing carbon blacks of the 100, 200 and 300 series, or the blacks of the 500, 600 or 700 series (ASTM D-1765-2017 grades), such as, for example, the N115, N134, N234, N326, N330, N339, N347, N375, N550, N683 and N772 blacks. These carbon blacks can be used in the isolated state, as available commercially, or in any other form, for example as support for some of the rubber additives used. The carbon blacks could, for example, already be incorporated into the diene elastomer, in particular isoprene elastomer, in the form of a masterbatch (see for example applications WO97/36724-A2 or WO99/16600-A1). The BET specific surface area of the carbon blacks is measured according to Standard D6556-10 [multipoint (a minimum of 5 points) method—gas: nitrogen—relative pressure P/PO range: 0.1 to 0.3].

Mention may be made, as an example of organic fillers other than carbon blacks, of functionalized polyvinyl organic fillers, such as described in applications WO2006/069792-A1, WO2006/069793-A1, WO2008/003434-A1 and WO2008/003435-A1.

The term "reinforcing inorganic filler" should be understood here as meaning any inorganic or mineral filler, whatever its colour and its origin (natural or synthetic), also known as "white" filler, "clear" filler or even "non-black" filler, in contrast to carbon black, capable of reinforcing, by itself alone, without means other than an intermediate coupling agent, a rubber composition intended for the manufacture of tyres. In a known manner, certain reinforcing inorganic fillers can be characterized in particular by the presence of hydroxyl groups (—OH) on their surface.

Mineral fillers of the siliceous type, preferentially silica ($SiO_2$), or of the aluminous type, in particular alumina ($Al_2O_3$), are suitable in particular as reinforcing inorganic fillers. The silica used can be any reinforcing silica known to those skilled in the art, in particular any precipitated or fumed silica exhibiting a BET specific surface area and a CTAB specific surface area both of less than 450 $m^2/g$, preferably within a range extending from 30 to 3s 400 $m^2/g$, in particular from 60 to 300 $m^2/g$.

In the present disclosure, the BET specific surface area is determined by gas adsorption using the Brunauer-Emmett-Teller method described in "The Journal of the American Chemical Society", (Vol. 60, page 309, February 1938), and more specifically according to a method derived from Standard NF ISO 5794-1, appendix E, of June 2010 [multipoint (5 point) volumetric method—gas: nitrogen—degassing under vacuum: one hour at 160° C.—relative pressure p/po range: 0.05 to 0.17].

S For the inorganic fillers such as silica for example, the CTAB specific surface area values were determined according to Standard NF ISO 5794-1, appendix G of June 2010. The process is based on the adsorption of CTAB (N-hexadecyl-N,N,N-trimethylammonium bromide) onto the "outer" surface of the reinforcing filler.

Any type of precipitated silica can be used, in particular highly dispersible precipitated silicas (termed "HDS" for "highly dispersible" or "highly dispersible silica"). These precipitated silicas, which may or may not be highly dispersible, are well known to those skilled in the art. Mention may be made, for example, of the silicas described in applications WO03/016215-A1 and WO03/016387-A1. Among the commercial HDS is silicas, it is possible in particular to use the silicas "Ultrasil® 5000GR", "Ultrasil® 7000GR" from the company Evonik, the silicas "Zeosil® 1085GR", "Zeosil® 1115 MP", "Zeosil® 1165MP", "Zeosil® Premium 200MP", "Zeosil® HRS 1200 MP" from the company Solvay. As non-HDS silica, the following commercial silicas can be used: the silicas "Ultrasil® VN2GR", "Ultrasil® VN3GR" from the company Evonik, the silica "Zeosil® 175GR" from the company Solvay, the silicas "Hi-Sil EZ120G(-D)", "Hi-Sil EZ160G(-D)", "Hi-Sil EZ200G(-D)", "Hi-Sil 243LD", "Hi-Sil 210", "Hi-Sil HDP 320G" from the company PPG.

As other examples of inorganic fillers that can be used in the rubber compositions of the invention, mention may also be made of mineral fillers of the aluminous type, in particular alumina ($Al_2O_3$), aluminium oxides, aluminium hydroxides, aluminosilicates, titanium oxides, silicon carbides or nitrides, all of the reinforcing type as described for example in applications WO99/28376-A2, WO00/73372-A1, WO02/053634-A1, WO2004/003067-A1, WO2004/056915-A2, U.S. Pat. No. 6,610,261-B1 and U.S. Pat. No. 6,747,087-B2.

Mention may in particular be made of the aluminas "Baikalox A125" or "CR125" (Baikowski company), "APA-100RDX" (Condea), "Aluminoxid C" (Evonik) or "AKP-G015" (Sumitomo Chemicals).

The physical state in which the reinforcing inorganic filler is provided is not important, whether it is in the form of a powder, of microbeads, of granules, or else of beads or any other appropriate densified form. Of course, reinforcing inorganic filler is also understood to mean mixtures of different reinforcing inorganic fillers, in particular of silicas as described above.

Those skilled in the art will understand that, instead of the reinforcing inorganic filler described above, a reinforcing filler of another nature could be used, as long as this reinforcing filler of another nature would be covered with an inorganic layer such as silica, or else would comprise functional sites, in particular hydroxyls, at its surface, requiring the use of a coupling agent to establish the bond between this reinforcing filler and the diene elastomer. By way of example, mention may be made of carbon blacks partially or fully covered with silica, or carbon blacks modified with silica, such as, without limitation, the fillers of the "Ecoblack" type of the "CRX2000" series or of the "CRX4000" series from the company Cabot Corporation.

In order to couple the reinforcing inorganic filler to the diene elastomer, use may be made, in a well-known way, of an at least bifunctional coupling agent (or bonding agent) intended to provide a satisfactory connection, of chemical and/or physical nature, between the inorganic filler (surface of its particles) and the diene elastomer. Use is made in particular of organosilanes or polyorganosiloxanes which are at least bifunctional. The term "bifunctional" is understood to mean a compound having a first functional group capable of interacting with the inorganic filler and a second functional group capable of interacting with the diene elastomer. For example, such a bifunctional compound can comprise a first functional group comprising a silicon atom, said first functional group being able to interact with the hydroxyl groups of an inorganic filler and a second functional group comprising a sulfur atom, said second functional group being able to interact with the diene elastomer.

Preferably, the organosilanes are selected from the group consisting of organosilane polysulfides (symmetrical or asymmetrical) such as bis(3-triethoxysilylpropyl) tetrasulfide, abbreviated to TESPT sold under the name "Si69" by the company Evonik or bis(triethoxysilylpropyl)disulfide, abbreviated to TESPD sold under the name "Si75" by the company Evonik, polyorganosiloxanes, mercaptosilanes, blocked mercaptosilanes, such as S-(3-(triethoxysilyl)propyl) octanethioate sold by the company Momentive under the name "NXT Silane". More preferentially, the organosilane is an organosilane polysulfide.

Of course, use might also be made of mixtures of the coupling agents described above.

Typically, the content of coupling agent represents from 0.5% to 15% by weight, with respect to the amount of reinforcing inorganic filler. Its content is preferentially within a range extending from 0.5 to 20 phr. This content is easily adjusted by those skilled in the art according to the content of reinforcing inorganic filler used in the composition of the invention.

As indicated above, it is possible for the composition of the tyre according to the invention not to comprise a reinforcing filler. Alternatively, the total reinforcing filler content is less than 25 phr, it being understood that the total carbon black content is less than 20 phr. This is because the applicant has observed that the use of reinforcing filler at a content of less than 25 phr makes it possible to improve both the reinforcement of the composition but also the elongation at break, whereas above 25 phr, no improvement in elongation at break of the compositions in accordance with the invention is observed.

Advantageously, the composition of the tyre according to the invention comprises less than 20 phr, preferably less than 15 phr, more preferably less than 10 phr of reinforcing filler.

Particularly advantageously, the composition of the tyre according to the invention comprises more than 0 to 18 phr, preferably from 1 to 15 phr, more preferably from 2 to less than 5 phr, of carbon black.

II-5 Other Possible Additives

The rubber compositions of the tyre according to the invention may optionally also comprise all or some of the usual additives customarily used in elastomer compositions for tyres, such as for example plasticizers (such as plasticizing oils and/or plasticizing resins), pigments, protective agents such as anti-ozone waxes, chemical anti-ozonants, antioxidants, anti-fatigue agents, reinforcing resins (as described for example in application WO 02/10269).

II-6 Tyres

A subject of the present invention is also a finished or semi-finished rubber article, as well as a tyre, comprising a composition in accordance with the present invention.

The invention relates in particular to tyres intended to equip motor vehicles of passenger vehicle type, SUVs ("Sport Utility Vehicles"), or two-wheel vehicles (notably motorcycles), or aircraft, or else industrial vehicles selected from vans, "heavy-duty" vehicles, i.e. underground trains, buses, heavy road transport vehicles (lorries, tractors, trailers), or off-road vehicles, such as heavy agricultural vehicles or civil engineering vehicles, and the like.

It is possible to define, within the tyre, three types of regions:
- The radially exterior region in contact with the ambient air, this region essentially consisting of the tread and of the outer sidewall of the tyre. An outer sidewall is an elastomeric layer positioned outside the carcass reinforcement relative to the internal cavity of the tyre, between the crown and the bead, so as to completely or partially cover the region of the carcass reinforcement extending from the crown to the bead.
- The radially interior region in contact with the inflation gas, this region generally being composed of the layer airtight to the inflation gases, sometimes known as interior airtight layer or inner liner.
- The internal region of the tyre, that is to say that between the exterior and interior regions. This region includes layers or plies which are referred to here as internal layers of the tyre. These are, for example, carcass plies, tread underlayers, tyre belt plies or any other layer which is not in contact with the ambient air or the inflation gas of the tyre.
- The tread, the tread surface of which is provided with a tread pattern formed by a plurality of grooves delimiting elements in relief (blocks, ribs) so as to generate edge corners of material and also voids. These grooves represent a volume of voids which, with respect to the total volume of the tread (including both the volume of elements in relief and that of all the grooves), is expressed by a percentage denoted, in the present document, by "volumetric void ratio". A volumetric void ratio equal to zero indicates a tread without grooves or voids.

The present invention is particularly well suited to tyres intended for civil engineering or agricultural vehicles and for heavy-duty vehicles, more particularly for civil engineering or agricultural vehicles, the tyres of which are subjected to highly specific stresses, in particular the stony ground surfaces on which they run. Thus, advantageously, the tyre according to the invention is a tyre for civil engineering, agricultural or heavy-duty vehicles, preferably civil engineering vehicles.

The composition defined in the present description is particularly well suited to tyre treads, in particular for a tyre for a vehicle intended to bear heavy loads, in particular from the point of view of the endurance of the tyre. Thus, advantageously, the composition of the tyre according to the invention is present in the tread of the tyre.

The tread of the tyre according to the invention may have one or more grooves, the mean depth of which ranges from 15 to 120 mm, preferably 65 to 120 mm.

The tyres according to the invention can have a diameter ranging from 20 to 63 inches, preferably from 35 to 63 inches.

Moreover, the mean volumetric void ratio over the whole of the tread of the tyre according to the invention can be within a range extending from 5% to 40%, preferably from 5% to 25%.

The composition defined in the present description is also well suited to the internal layers. Thus, the composition of the tyre according to the invention is present in at least one internal layer of the tyre. The internal layer can be selected from the group consisting of carcass plies, crown plies, bead-wire fillings, crown feet, decoupling layers, edge rubbers, padding rubbers, the tread underlayer and the combinations of these internal layers. Preferably, the internal layer is selected from the group consisting of is carcass plies, crown plies, bead-wire fillings, crown feet, decoupling layers and combinations of these internal layers.

The invention relates to the tyres and semi-finished products for tyres described above, articles made of rubber, both in the raw state (that is to say, before curing) and in the cured state (that is to say, after crosslinking or vulcanization).

II-7 Preparation of the Rubber Compositions

The rubber composition in accordance with the invention is manufactured in appropriate mixers using two successive preparation phases well known to those skilled in the art:
- a first phase of thermomechanical working or kneading ("non-productive" phase), which can be carried out in a single thermomechanical step during which all the necessary constituents, in particular the elastomeric matrix, the optional fillers and the optional other various additives, with the exception of the crosslinking system, are introduced into an appropriate mixer, such as a standard internal mixer (for example of 'Banbury' type). The incorporation of the optional filler into the elastomer may be performed in one or more portions while thermomechanically kneading. The non-productive phase can be carried out at high temperature, up to a maximum temperature of between 110° C. and 200° C., preferably between 130° C. and 185° C., for a period of time generally of between 2 and 10 minutes.
- a second phase of mechanical working ("productive" phase), which is carried out in an external mixer, such as an open mill, after cooling the mixture obtained during the first non-productive phase down to a lower temperature, typically of less than 120'C, for example between 40° C. and 100° C. The crosslinking system is then incorporated and the combined mixture is then mixed for a few minutes, for example between 5 and 15 min.

Such phases have been described, for example, in applications EP-A-0501227, EP-A-0735088, EP-A-0810258, WO00/05300 or WO00/05301.

The final composition thus obtained is subsequently calendered, for example in the form of a sheet or of a plaque, in particular for a laboratory characterization, or also extruded in the form of a rubber semi-finished (or profiled) element which can be used, for example, as a tyre tread for a civil engineering vehicle. These products can subsequently be used for the manufacture of tyres, according to techniques known to those skilled in the art.

The composition may be either in the raw state (before crosslinking or vulcanization) or in the cured state (after crosslinking or vulcanization), or may be a semi-finished product which can be used in a tyre.

The crosslinking of the composition can be carried out in a way known to those skilled in the art, for example at a temperature of between 130° C. and 200° C., under pressure.

III—Examples

III-1 Measurements and Tests Used

Dynamic Properties (after Curing): Tensile Test

These tensile tests make it possible to determine the elasticity stresses and the properties at break. Unless otherwise indicated, they are carried out in accordance with French Standard NF T 46-002 of September 1988. Processing the tensile recordings also makes it possible to plot the curve of modulus as a function of the elongation. The modulus used here is the true secant modulus measured in first elongation, calculated by normalizing to the true cross section of the test specimen at any moment of the test. The nominal secant moduli (or apparent stresses, in MPa) are measured in first elongation at 50%, 100% and 300% elongation, respectively denoted M50, M100 and M300. The MSV300/MSV100 ratio is an indicator of the reinforcement of the rubber composition. The higher this ratio, the stronger the reinforcement of the composition.

The elongation at break (EB %) and breaking stress (BS) tests are based on Standard NF ISO 37 of December 2005 on an H2 dumbbell test specimen and are measured at a tensile speed of 500 mm/min. The elongation at break is expressed as a percentage of elongation. The breaking stress is expressed in MPa.

All these tensile measurements are carried out under the standard conditions of temperature (23±2° C.) and hygrometry (50±5% relative humidity), according to French Standard NF T 40-101 (December 1979).

The dynamic properties G* (25%) and tan(S)max at 60° C. are measured on a viscosity analyser (Metravib VA4000), according to Standard ASTM D 5992-96. The response of a sample of crosslinked composition (cylindrical test specimen with a thickness of 4 mm and a cross section of 400 mm²), subjected to a simple alternating sinusoidal shear stress, at a frequency of 10 Hz, under the defined conditions of temperature, for example at 60° C., according to Standard ASTM D 1349-99 or, as the case may be, at a different temperature, is recorded. A strain amplitude sweep is carried out from 0.1% to 50% (outward cycle) and then from 50% to 1% (return cycle). The results made use of are the complex dynamic shear modulus G* and the loss factor tan(S). The maximum value of tan(6) observed, denoted tan(S)max, and the complex dynamic shear modulus G* at 25% strain, at 60° C., are shown for the return cycle.

III-2 Preparation of the Compositions

The tests which follow are carried out in the following way: the thermoplastic polyurethane then the elastomer, the optional reinforcing fillers and also the various other ingredients, with the exception of the crosslinking system, are successively introduced into a blade mixer (final degree of filling: approximately 70% by volume), the initial vessel temperature of which is approximately 175° C. Thermomechanical working (non-productive phase) is then carried out in one step, which lasts in total approximately from 5 to 8 min, until a maximum "dropping" temperature of 175° C. is reached.

The mixture thus obtained is recovered and cooled and then the crosslinking system is incorporated on a mixer (homofinisher) at 23° C. or 50° C., respectively, everything being mixed (productive phase) in a roll mill for an appropriate time (for example between 5 and 12 min).

The compositions thus obtained are subsequently calendered, either in the form of plaques (thickness of 2 to 3 mm) or of thin sheets of rubber, for the measurement of their physical or mechanical properties, or extruded in the form of a profiled element.

III-3 Tests on Rubber Compositions

The examples presented in Table 1 are intended to compare the mechanical properties and the reinforcement of compositions in accordance with the invention (C1, C2, C3 and C4) with those of control compositions (T1 and T2) which differ from the compositions in accordance with the invention in that they do not comprise diene elastomer and thermoplastic polyurethane concomitantly. The formulations (in phr) and the properties thereof have been summarized in Table 1 below.

TABLE 1

|  | T1 | T2 | C1 | C2 | C3 | C4 |
|---|---|---|---|---|---|---|
| NR (1) | 100 | — | 60 | 80 | 40 | 60 |
| TPU 1 (2) | — | 100 | 40 | 20 | 60 | 40 |
| N234 (3) | — | — | — | — | — | 10 |
| Sulfur | 1.5 | 1.5 | 1.5 | 1.5 | 1.5 | 1.5 |
| CBS (5) | 1 | 1 | 1 | 1 | 1 | 1 |
| ZnO (6) | 2.5 | 2.5 | 2.5 | 2.5 | 2.5 | 2.5 |
| Stearic acid (7) | 1 | 1 | 1 | 1 | 1 | 1 |
| MSV 300/100 | 100 | 93 | 118 | 107 | 101 | 125 |
| MSV break | 100 | 1376 | 365 | 278 | 418 | 527 |
| % EB | 100 | 145 | 113 | 119 | 113 | 124 |

(1) Natural rubber
(2) Thermoplastic polyurethane (Desmopan 3378A from the company Bayer)
(3) Carbon black, ASTM grade N234 from the company Cabot
(5) N-Cyclohexyl-2-benzothiazolesulfenamide (Santocure CBS from the company Flexsys)
(6) Zinc oxide (industrial grade - the company Umicore)
(7) Stearin (Pristerene 4931 from the company Uniqema)

These results show that the compositions in accordance with the invention all make it possible to improve the compromise in mechanical properties without penalizing the reinforcement of the composition, or even while improving it. These results also show that the addition of a small amount of carbon black makes it possible to significantly improve all of the mechanical properties measured.

A control composition T3 was produced to determine the influence of increasing the carbon black content.

TABLE 2

|  | T1 | C4 | T3 |
|---|---|---|---|
| NR (1) | 100 | 60 | 60 |
| TPU 1 (2) | — | 40 | 40 |
| N234 (3) | — | 10 | 30 |
| Sulfur | 1.5 | 1.5 | 1.5 |
| CBS (5) | 1 | 1 | 1 |

TABLE 2-continued

|  | T1 | C4 | T3 |
|---|---|---|---|
| ZnO (6) | 2.5 | 2.5 | 2.5 |
| Stearic acid (7) | 1 | 1 | 1 |
| % EB | 100 | 124 | 100 |

(1) to (7): see Table 1

These results show that increasing the amount of carbon black above 25 phr no longer makes it possible to improve the elongation at break of the composition.

The invention claimed is:

1. A tire comprising a rubber composition based on:
   at least one diene elastomer;
   at least one thermoplastic polyurethane; and
   a crosslinking system,
   wherein the rubber composition does not comprise any reinforcing filler or comprises less than 25 parts by weight thereof per hundred parts by weight of elastomer, phr, the carbon black content in the rubber composition being less than 20 phr, and
   wherein the at least one thermoplastic polyurethane comprises at least one flexible segment and at least one rigid segment, the flexible segment resulting from a reaction of a polyisocyanate with a polyol, the molecular weight of the hydrocarbon-based chain of which is between 600 and 2500 g/mol, and the rigid segment resulting from a reaction of a polyisocyanate with a diol or triol, the molecular weight of which is within a range extending from 40 to 350 g/mol.

2. The tire according to claim 1, wherein the at least one diene elastomer is selected from the group consisting of polybutadienes, synthetic polyisoprenes, natural rubber, butadiene copolymers, isoprene copolymers and mixtures thereof.

3. The tire according to claim 1, wherein the at least one diene elastomer is an isoprene elastomer.

4. The tire according to claim 1, wherein a content of the at least one diene elastomer in the rubber composition is within a range extending from 20 to 90 phr.

5. The tire according to claim 1, wherein a content of the at least one thermoplastic polyurethane in the rubber composition is within a range extending from 10 to 80 phr.

6. The tire according to claim 1, wherein the rubber composition does not comprise any reinforcing filler or comprises less than 20 phr.

7. The tire according to claim 1, wherein the carbon black content is within a range extending from more than 0 to 18 phr.

8. The tire according to claim 1, wherein the crosslinking system is based on molecular sulfur, a sulfur-donating agent, or both molecular sulfur and a sulfur-donating agent.

9. The tire according to claim 1, wherein the rubber composition is present in a tread of the tire.

10. The tire according to claim 1, wherein the tire is a tire for civil engineering, agricultural or heavy-duty vehicles.

* * * * *